US012364965B2

(12) United States Patent
Even et al.

(10) Patent No.: US 12,364,965 B2
(45) Date of Patent: Jul. 22, 2025

(54) HIGH-ENERGY LASER SURFACE PROCESSING FOR INDUSTRIAL COLUMN PACKING

(71) Applicant: Honeywell Federal Manufacturing & Technologies, LLC, Kansas City, MO (US)

(72) Inventors: Dakota Even, Kansas City, MO (US); Connor Daniel Pearson, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/770,192

(22) Filed: Jul. 11, 2024

(65) Prior Publication Data
US 2025/0018360 A1    Jan. 16, 2025

Related U.S. Application Data

(60) Provisional application No. 63/526,003, filed on Jul. 11, 2023.

(51) Int. Cl.
B01J 19/30    (2006.01)
B01D 3/34    (2006.01)
(Continued)

(52) U.S. Cl.
CPC .............. B01J 19/30 (2013.01); B01D 3/346 (2013.01); B23K 26/0624 (2015.10);
(Continued)

(58) Field of Classification Search
CPC .......... B01J 19/30; B01J 19/305; B01J 19/32; B01J 2219/30–3327
See application file for complete search history.

(56) References Cited

U.S. PATENT DOCUMENTS 3,227,429 A * 1/1966 Peter .................. B01J 19/32
                                                  435/813
4,999,172 A * 3/1991 Simons .............. B01D 53/52
                                                  423/576.2
(Continued)

OTHER PUBLICATIONS

Bao-jia Li, Huang Li, Li-jing Huang, Nai-fei Ren, Xia Kong, "Femtosecond pulsed laser textured titanium surfaces with stable superhydrophilicity and superhydrophobicity," Applied Surface Science, vol. 389, 2016, pp. 585-593, ISSN 0169-4332, https://doi.org/10.1016/j.apsusc.2016.07.137.*

(Continued)

Primary Examiner — Jonathan Luke Pilcher
(74) Attorney, Agent, or Firm — Erise IP, P.A.

(57) ABSTRACT

Systems and methods for industrial tower packing using a high-energy laser surface processing technique are disclosed. The system includes a tower, a high-energy laser, a plurality of packing materials, and micro-sized or nano-sized structures on a packing material. The high-energy laser surface processing technique creates microscale structures that allow for high surface wettability. The high-energy laser creates micro-sized or nano-sized structures on a plurality of packing materials surfaces. The packing materials may be provided in industrial columns. The packing materials may be various shapes and sizes comprising various structures ablated into a surface of the packing materials to generate high surface area contact between a downward-flowing liquid and an upward-flowing gas. The use of a high-energy laser surface processing results in favorable super-wettable column packing material and geometry.

14 Claims, 8 Drawing Sheets

(51) Int. Cl.
*B23K 26/0622* (2014.01)
*B23K 26/364* (2014.01)

(52) U.S. Cl.
CPC ... *B23K 26/364* (2015.10); *B01J 2219/30288* (2013.01); *B01J 2219/30408* (2013.01); *B01J 2219/3086* (2013.01); *B01J 2219/318* (2013.01)

(56) References Cited

U.S. PATENT DOCUMENTS

| | | | | |
|---|---|---|---|---|
| 5,259,931 A | * | 11/1993 | Fox | B01D 3/346 |
| | | | | 159/901 |
| 5,262,012 A | * | 11/1993 | Smith, Jr. | B01J 19/30 |
| | | | | 261/95 |
| 5,338,518 A | * | 8/1994 | Marion | B01J 8/048 |
| | | | | 422/142 |
| 5,635,035 A | * | 6/1997 | Koshy | B01D 3/32 |
| | | | | 216/100 |
| 6,206,349 B1 | * | 3/2001 | Parten | B01J 19/32 |
| | | | | 261/112.2 |
| 6,666,436 B1 | * | 12/2003 | Lerner | B01J 19/30 |
| | | | | 261/95 |
| 9,295,925 B2 | * | 3/2016 | Chen | B01D 3/008 |
| 11,014,065 B2 | * | 5/2021 | Ikeda | B01D 53/18 |
| 2009/0169871 A1 | * | 7/2009 | Lappalainen | C23C 14/081 |
| | | | | 427/596 |

OTHER PUBLICATIONS

"Hydrophilic Stainless-Steel Coatings", Aculon, May 18, 2018 (date obtained from WayBack Machine); http://www.aculon.com/hydrophilic-stainless-steel.*

* cited by examiner

HIGH-ENERGY LASER SURFACE PROCESSING FOR INDUSTRIAL COLUMN PACKING

RELATED APPLICATIONS

This non-provisional patent application claims priority benefit, with regard to all common subject matter, of earlier-filed U.S. Provisional Patent Application No. 63/526,003 filed Jul. 11, 2023, and entitled "HIGH-ENERGY LASER SURFACE PROCESSING FOR INDUSTRIAL COLUMN PACKING." The identified earlier-filed provisional patent application is hereby incorporated by reference in its entirety into the present application.

STATEMENT OF GOVERNMENTAL SUPPORT

This invention was made with government support under DE-NA-0002839 awarded by the United States Department of Energy/National Nuclear Security Administration. The government has certain rights in the invention.

BACKGROUND

1. Field

Embodiments of the disclosure provide a system and method for surface processing of packing materials for industrial column packing. More specifically, embodiments of the present disclosure are directed to surface processing of multiscale surface and microstructures by high-energy lasers for industrial column packing.

2. Related Art

A packed distillation column is a large cylindrical vessel filled with packing materials or a tray that can enhance mass transfer between two fluids. There are two main types of distillation and stripping columns: trayed columns and packed columns. Furthermore, packed columns may comprise random or structured packing.

Tray columns comprise a stack of trays, often metal, that are oriented horizontally across a column's interior. The trays are designed to hold a liquid while the rising vapor flows upwards. The trays have openings that allow vapor to flow upward through the column and conduits to allow liquid to flow downwards through the column. Historically, tray column packing has been more predictable than packed column packing.

Packed column packing can be random or structured. In random packing, the packing materials may be collected randomly in a packaging bed inside the collection container. In random column packing, packing materials may be disposed into a column randomly and allowed to settle. The pieces of random packing in a distillation column are designed to form a large surface area where the components can interact while minimizing complexity within the column. Alternatively, structured column packing is used to channel liquid materials into a specific shape. Structured column packing uses various designed shapes (e.g., discs or honeycomb shapes) comprising materials such as metal, plastic, or porcelain with the structures arranged in the column.

The wettability of solid surfaces has been a subject of interest due to the wide-ranging applications involving such interactions. Surface wettability is commonly measured in terms of contact angle. A parameter used to characterize the wetting nature of surfaces is the contact angle hysteresis. The contact angle hysteresis can be measured as the difference between the advancing and receding contact angles at the instant before a droplet rolls off the surface as the surface is tilted. The contact angle hysteresis is often used to characterize whether the surface is sticky or slippery. A small contact angle hysteresis is desirable when slippery surfaces with low roll-off angles are required.

There are several applications of hydrophobic, superhydrophobic, hydrophilic, and superhydrophilic surfaces in fields such as biological cell research, opto-fluidics, fuel cell research, drag reduction, printing, liquid mixture, chemical manufacturing, industrial manufacturing, industrial column packing, purifying waste streams, liquid separation, etc. The choice of materials, fabrication technique, and degree of hydrophobicity or hydrophilicity required depends on the specific application. Column packing is used in several applications, such as industrial manufacturing, chemical manufacturing, and purifying waste streams. Previously, packing materials have been molded into desired shapes from metals, plastics, and ceramics, with no further processing.

Generally, industrial stripping columns and packed columns are vertical columns that are filled with packing materials of various shapes. The objective of the packing is to generate high surface area contact between a downward-flowing liquid and an upward-flowing gas. One problem associated with industrial column packing using these methods is that the columns must be large—in some applications, up to 100 ft tall—to be effective. These large columns take up large amounts of space and must be contained in large buildings that must be built specifically for the purpose of housing the column. Typically, the buildings and industrial columns must be custom-built, requiring large amounts of capital investments.

Thus, there exists an unmet need for a reliable surface processing method to make super wettable column packing that causes high-surface-area contact between liquids and gas that can make these processes more efficient and reduce the size requirements of industrial columns and the buildings housing them.

SUMMARY

The above-described problems are solved by embodiments of the current disclosure. In some embodiments, a high-energy pulse laser is used to create micro/nano-sized structures on packing material for industrial column packing. The micro/nano-sized structures may improve the surface wettability of the packing mixture, improving the efficiency over current methods. The more efficient surface wettability may result in improved area-to-volume contact values between liquid and gaseous phases, resulting in more efficient mass transfer, thereby reducing the size of industrial columns necessary for housing the packing materials.

An exemplary embodiment of the disclosure comprises a method of improving surface-area contact between a liquid and a vapor in an industrial packing column. The method comprises ablating packing material by a high-energy laser to create structures on the surface of the packing material, wherein the structures comprise nano-sized or micro-sized channels, randomly providing the packing material in a column packing tower, providing a mixture comprising an unwanted material in a liquid phase into the column packing tower above the packing material, providing a gas from below the packing material, removing the unwanted material from the liquid phase by heating or absorbing the unwanted material into the gas in the structures on the surface of the packing material, extracting the unwanted material from the gas, and venting the gas from the column packing tower.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
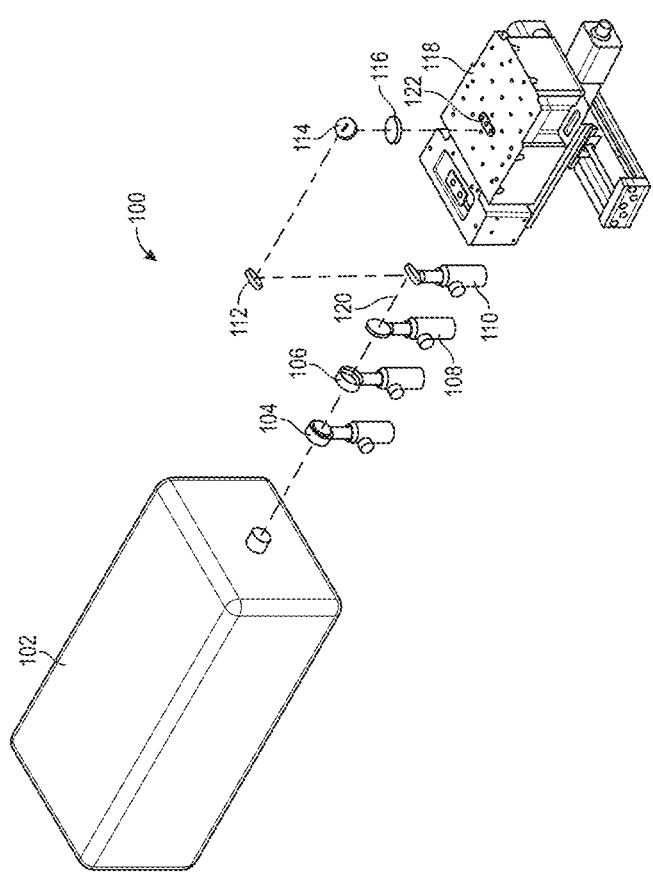
FIG. 1 depicts various hardware components of a single-pulse laser for some embodiments of the disclosure.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the present technology can include a variety of combinations and/or integrations of the embodiments described herein.

Generally, a high-energy pulse laser (e.g., a femtosecond laser) may be used to create micro- or nano-sized structures on packing material. In some embodiments, the structures may be random or patterned, and the shape, depth, and width of the structure may result in the structure increasing a surface contact area between a vapor and liquid in industrial column packing. Furthermore, the processed packing material may be added to a general column-type tower (e.g., tower 300, shown in FIG. 3) for the below-described processes of distillation.

As a general overview, two processes occur during distillation in the tower: absorption and stripping. The liquid and vapor phases in the distillation part of the tower flow in opposite directions. Absorption is the process of removing unwanted materials or components in a vapor phase by dissolving components of the vapor phase in a liquid phase. Stripping is the process of removing the components from the liquid phase by transferring components in the liquid phase to the vapor phase. To increase the efficiency of the absorption and stripping step, packing material may be used.

Figure 3:
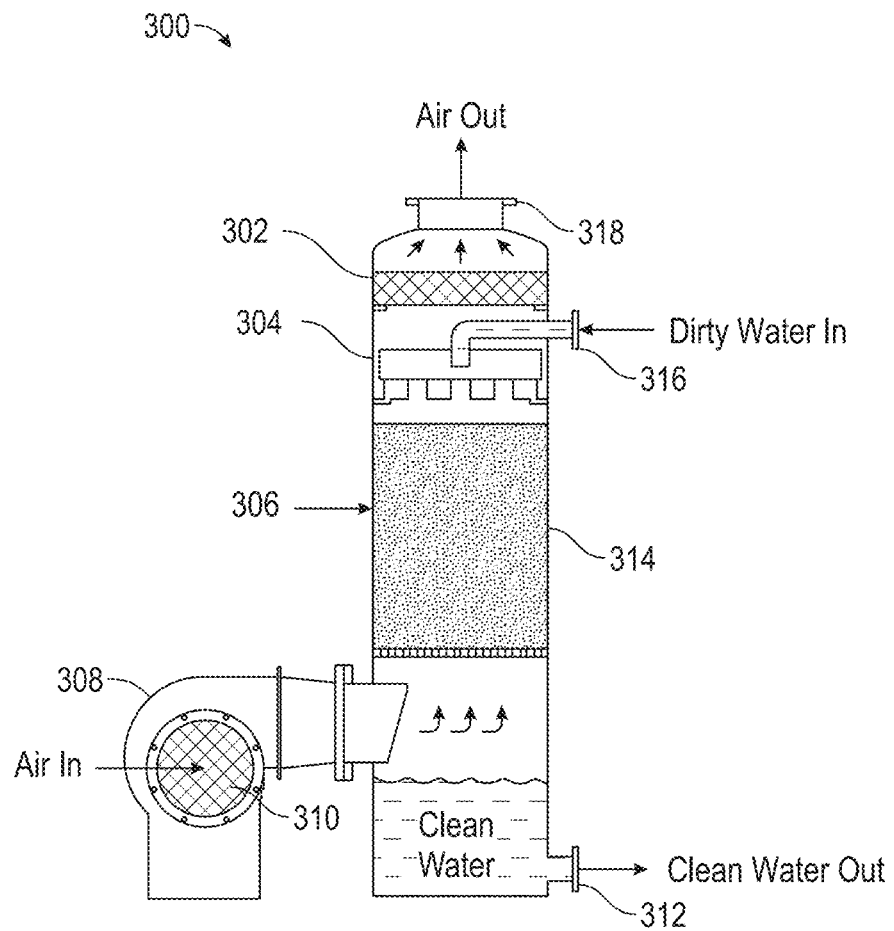
FIG. 3 depicts column-type tower for some embodiments of the disclosure.

In some embodiments, packing material increases the surface area in the distillation phase of the tower. As the liquid and vapor phases in the tower flow in opposite directions, the packing material may increase the exchange of mass and heat between the liquid and vapor phases. Packing of the packing material breaks up the liquid when pouring the liquid in from the top, which may result in high-surface-area contact. The liquid phase may be fed into the tower at the top (as shown in FIG. 3) or at any other location, and gasses (e.g., air) may be pumped from the bottom of the tower (as shown in FIG. 3) or at any other location, resulting in smooth contact. After the liquid phase is fed into the tower, water may be gravity-fed through the tower while air is forced upward out of the tower.

Industrial stripping towers and packed towers are vertical columns that may be filled with packing materials of various shapes and sizes. Because the surface of the packing material herein is processed, the water may wick fully into the structured surface. In turn, the processed surface of the packing material may increase the usable surface area. The process may achieve order-of-magnitude differences in mass transfer results. The processes described herein may result in the ability to use a much smaller tower than previously used in traditional column packing for industrial columns. In some embodiments, a high-energy laser surface processing technique may be used to create the super-wetting surfaces, further improving gas-liquid contact and significantly improving the efficiency of the industrial columns.

Turning now to the drawings, embodiments of the disclosure comprise systems and methods for using a high-energy laser surface processing technique of the packing materials for industrial column packing and utilizing the packing materials to provide a more efficient distillation process.

FIG. 1 depicts an example of high-energy laser system 100. In some embodiments, a beam of light is generated at light source 102. The light beam may be an ultrashort, femtosecond pulsed laser emitter. Light source 102 may be coupled to computer 802 (depicted in FIG. 8) and a power source, such as a battery or wall outlet providing the energy for high-energy laser system 100. In some embodiments, shutter 104 may fluctuate the timing of light pulses from light source 102. For example, shutter 104 may be configured to open and close within a range of a desired frequency (e.g., the femtosecond range). Light source 102 may be incident into a single-mode fiber using half-wave plate 106 and polarizer 108.

In some embodiments, the generated beam from the single-mode fiber constitutes a source beam 120. The source beam 120, in some embodiments, may be reflected using one or more mirrors such as first mirror 110, second mirror 112, and/or third mirror 114. The one or more mirrors may be used to redirect the source beam 120, such that source beam 120 directly or incidentally lands on translation stage 118. Following redirection by the one or more mirrors, source beam 120 may be focused using lens 116, such that the convergence of source beam 120 is near, or incident on, a sample 122 on translation stage 118. Translation stage 118 allows for the movement of sample 122 along the x-axis, the y-axis, and/or the z-axis, or generally in 3 orthogonal directions. In some embodiments, translation stage 118 may be connected to and controlled by computer 802. Movement of sample 122 by translation stage 118 may allow high-energy laser system 100 to engrave specific patterns onto sample 122. Broadly, sample 122 may comprise any material suitable for surface processing. A high-energy laser may be one of an ultra-short pulse laser system or dual-pulse laser system.

Figure 2A:
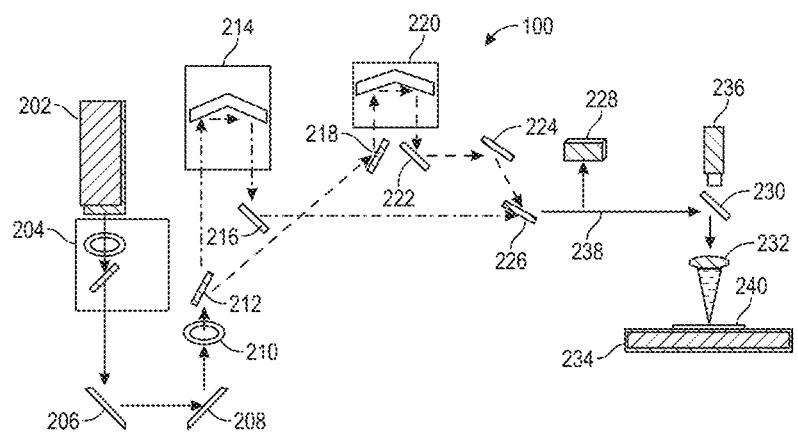
FIG. 2A depicts various hardware components of a high-energy laser for some embodiments of the disclosure.

In some embodiments, high-energy laser system 100 may be a high-energy pulse dual-pulse laser system, as depicted in FIG. 2A. High-energy laser system 100 may be configured to perform laser engraving on multiscale surfaces. Features and structures illustrated include light source 202, power attenuator 204, first mirror 206, second mirror 208, half-wave plate 210, first polarizer 212, trailing pulse stage 214, third mirror 216, second polarizer 218, leading pulse stage 220, fourth mirror 222, third polarizer 224, fourth polarizer 226, autocorrelator 228, fifth mirror 230, lens 232, translation stage 234, and camera 236. Embodiments of the invention may include any or all of the features and structures illustrated and may include additional features or structures not illustrated in FIG. 2A. Although five mirrors are illustrated, any number of mirrors may be used in the system depending on the desired configuration. Similarly, although four polarizers are illustrated, any number of polarizers may be used in the system depending on the desired configuration. As described above, in some embodiments, high-energy laser system 100 comprises a femtosecond laser.

In some embodiments, light may be emitted from light source 202, flow through power attenuator 204, and be directed into first polarizer 212, where the light may be polarized and directed into trailing pulse stage 214 and leading pulse stage 220. Polarized light exiting the trailing pulse stage 214 may be redirected by third mirror 216 towards fourth polarizer 226. Polarized light exiting the leading pulse stage 220 may be redirected by fourth mirror 222 and third polarizer 224 towards fourth polarizer 226. These separately polarized lights may be combined at the fourth polarizer 226 to generate source beam 238. Source beam 238 may be directed to autocorrelator 228 and fifth mirror 230. Autocorrelator 228 may measure the pulse duration of the laser beam, which may be determined from the measurement of the time delay and the intensity of source beam 238. In some embodiments, autocorrelator 228 may measure the pulse count, which is a function of the pulse delay and scan velocity. In some embodiments, autocorrelator 228 may be connected to computer 802 to relay information regarding pulse delay and/or pulse count of source beam 238.

After source beam 238 is generated at fourth polarizer 226, source beam 238 may be redirected by the fifth mirror 230 towards lens 232. Lens 232 may be configured to cause convergence of source beam 238 on or near translation stage 234. In some embodiments, lens 232 may regulate the diameter of source beam 238 when source beam 238 interacts with sample 240. In some embodiments, the location of translation stage 234 in the z-axis may regulate the diameter of source beam 238 when source beam 238 interacts with sample 240. Translation stage 234 allows for the movement of sample 240 along the x-axis, the y-axis, and/or the z-axis as described above. In some embodiments, translation stage 234 may be connected to and controlled by computer 802. In some embodiments, computer 802 may control the scan velocity of translation stage 234 by moving translation stage 234 using electromechanical actuators. Computer 802, similarly, may control the pulse count as mentioned above. In some embodiments, the movement of translation stage 234 controls the distance between scans (i.e., pitch) of sample 240 with source beam 238. Movement of sample 240 may allow for specific patterns of engraving from the high-energy laser system 100 onto sample 240, which may be controlled again by computer 802. Computer 802 and control of high-energy laser system 100 are described in detail below.

Figure 2B:
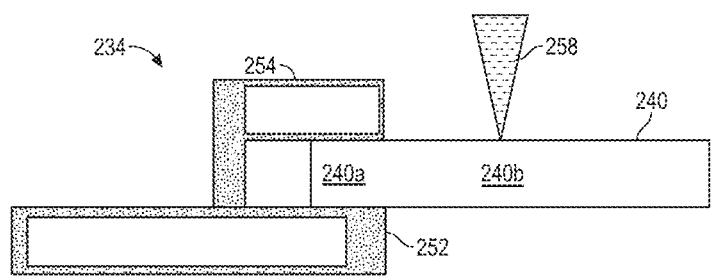
FIG. 2B illustrates a translation stage for some embodiments of the disclosure.

FIG. 2B illustrates translation stage 234 configured to hold and engrave a substrate (e.g., structures 408, depicted in FIG. 4) with high-energy laser system 200 in some embodiments. Translation stage 234 may include a lower clamp 252 and an upper clamp 254. In some embodiments, upper clamp 254 biases a first portion 240a of a sample 240 towards lower clamp 252, therein maintaining sample 240 stable on translation stage 234. Translation stage 234 leaves a second portion 240b of sample 240 protruding outwardly from lower clamp 252 and upper clamp 254, such that the second portion 240b may be engraved by laser beam 258. In some embodiments, translation stage 234 provides an empty space above and below sample 240. In typical stages, lower clamp 252 is fully covered by sample 240, providing a flat surface completely in contact with the lower surface of sample 240. Sample 240 may be partially or predominantly transparent, as in some embodiments of the present disclosure; however, this is not required, and sample 240 may be any material described below. In some embodiments described below, sample 240 may be packing material 306 comprising any of exemplary packing materials 400. As described herein, high-energy laser system 100 may be used to ablate packing material 306 to provide structures 408 to improve the liquid-vapor contact and thereby enhance the removal of unwanted material.

FIG. 3 depicts an example of tower 300 for liquid-vapor contact and removal of impurities and/or unwanted material. In some embodiments, the interior of tower 300 is filled with packing material 306 (shown as various types of exemplary packing materials 400 in FIG. 4). The packed tower comprises randomly structured or structured packing materials. Structured packing may be specifically organized in cases where packing material 306 is specifically shaped. Structured packing may result in a lower pressure drop between the liquid and vapor phases than in random packing since structured packing may be optimized; however, structured packing may be more costly and complex. In random column packing, packing materials may be added to a column and allowed to settle randomly. The random pieces of packing material 306 in a distillation column (e.g., tower 300) may be designed to form a large surface area where the packing material 306 can interact while minimizing the complexity of adding packing to tower 300. In some embodiments, packing material 306 has been modified by high-energy laser system 100 for optimal water and vapor flow and contact. In some embodiments, the shape and size of packing material 306 are selected to optimize surface area contact between the liquid and vapor phases. Packing material 306, when modified by high-energy laser system 100, provides a larger surface area per unit volume than unmodified packing material or packing material processed by other techniques. Generally, packing material 306 is provided in column 314 within tower 300.

During the column packing and material extraction processes, the liquid phase may be fed into tower 300 at liquid inlet 316. The tray distributor 304 may distribute the liquid evenly along the tray and packing material 306 at the top of column 314. As such, the liquid may be distributed evenly as the liquid is added into column 314 from above the packing material 306. The liquid then filters down throughout packing material 306 in column 314. The liquid, in some embodiments, includes unwanted material meant for extraction. The liquid with the unwanted material, in such embodiments, then evenly flows over packing material 306.

In some embodiments, air pump 308 may be connected to the inlet of the packing revisor positioned at the bottom of tower 300. When air pump 308 is active and air enters into air inlet 310, the flow may begin. Mist emitter 302 may be located at the top of tower 300 below outlet 318 and, therefore, before the vapor exits. Temperature and pressure may result in the vapor and liquid phases being in continuous contact on the surface of the packing material 306. Here, unwanted material from the liquid phase may be heated to vapor by the hot gas or may be absorbed into the gas. Mist emitter 302 may remove liquid droplets entrained in the vapor stream before the stream exits the top of tower 300. The mist may contain the unwanted material extracted from the stream. The stream may be condensed and purified, and the unwanted portion removed from the air before it exits the top of tower 300. Finally, the air flows out of outlet 318 of tower 300 at the top of tower 300. Once the unwanted material is substantially removed from the liquid phase, the next step is to stop air pump 308 and close the outlet 318. Clean water may then exit tower 300 at outlet 312.

In some embodiments, the shape and material of packing material 306 may be optimized depending on the desired outcome (e.g., stripping or absorbing) and the unwanted material to be removed. Broadly, packing material 306 aids in increasing the surface area between the gas phase and the liquid phase in the distillation process of the tower as described above. The increase in surface area between the gas phase and the liquid phase may increase the exchange of mass and heat, causing a higher rate of distillation and thereby reducing the required height of tower 300. The packing of the packing material 306 may allow the break-up of liquid as the mixture is distributed across the packing material 306, which results in high-surface-area contact between the liquid and gas. As described above, undesirable target materials in the liquid phase may be absorbed into the gas phase or heated to boiling and then removed. Similarly, or alternatively, undesirable components from the gas phase may be removed into the liquid phase. The liquid phase and the gas phase of the mixture may continuously interact to remove unwanted materials or components from the mixture.

Figure 4:
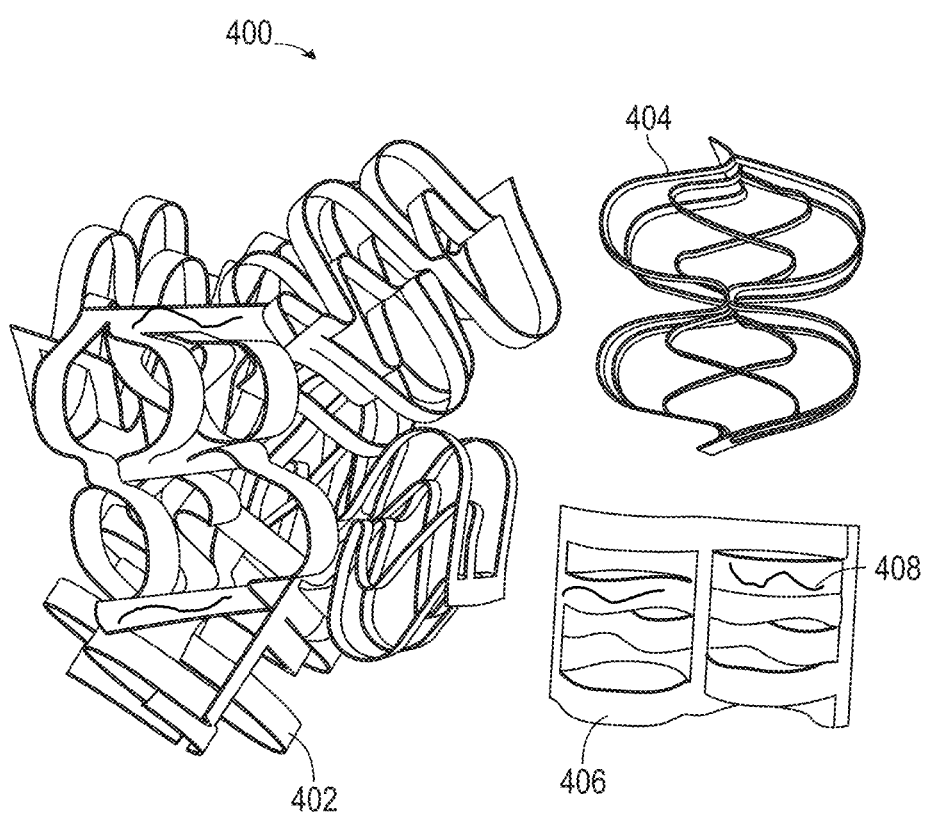
FIG. 4 depicts exemplary packing materials for use inside the tower depicted in FIG. 3.

Referring to FIG. 4, exemplary packing materials 400 may be disposed in column 314 in tower 300 (depicted in FIG. 3). Packing material 306 disposed in column 314 may include any of exemplary packing materials 400. For example, packing material 306 may include metal with varying shapes such as shape 402, shape 404, and shape 406. Packing material 306 generally provides for a high-surface-area contact between liquids and gases as described above based on the varying shapes, sizes, and surface features (e.g., structures 408). In some embodiments, packing material 306 comprises aluminum, plastic, ceramic, metal, elastic, porcelain, silica, or any other material that may achieve the characteristics described herein. Packing material 306 may be any shape and size and may include any abstract features on the surface. Packing material 306 may be random material left over from manufacturing processes or may be specific shapes and sizes designed to optimize the material extraction processes described herein.

Exemplary packing materials 400 may be any shape, including ring, kite, diamond, triangle, pentagon, octagon, quadrilateral, dimples, stone, key, screw, ridge, saddle, oval, line, hexagon, or any other that may be found to provide desired results. In some embodiments, the shape of packing material 306 may be optimized and manufactured based on the desired application. In other embodiments, exemplary packing materials 400 may be of a shape that minimizes cost or pre-processing. For example, if a particular instance of exemplary packing materials 400 is generated as a byproduct of another manufacturing product, it may be left in the shape (or shapes) resulting from that manufacturing process or simply ground to reduce size. In some embodiments, the surface of packing material 306 may be black to absorb sunlight efficiently. By doing so, a black surface may keep packing material 306 warm and thereby prevent ice formation that would inhibit high-surface-area contact between the liquid phase and the gas phase. Broadly, however, any color may be used for embodiments of packing material 306.

The surface of exemplary packing materials 400 may be engraved with structures 408, as described in detail below, to increase the hydrophilicity of packing material 306. For example, a superhydrophilic material will be more thoroughly wetted by the liquid phase, resulting in better contact for mixing with the gas phase. In some embodiments, structures 408 may comprise ablated paths such as those depicted in FIGS. 5A and 5B. Structures 408 may include any shape and configuration of engravings, and the engravings may be optimized to tune the hydrophilic or hydrophobic properties of exemplary packing materials 400. Similarly, any depth and width of structures (such as the engraved paths depicted in FIGS. 5A and 5B) may be produced to optimize the results of the processes described herein. For example, the engravings on may range between 1-100 microns, 10-75 microns, or 40-60 microns. Packing material 306 may include any exemplary packing materials 400 individually or in any combination, processed to include structures 408 or otherwise. In some embodiments, packing material 306 may be formed from one or more sheets with patterned engravings. In some embodiments, the sheets may be stacked and bent (for example, into shapes such as shape 402, shape 404, and/or shape 406) to increase the absorption of unwanted materials into the liquid phase. It is contemplated that the forming of the shape of exemplary packing materials 400 may be performed before or after the engraving of structures 408. For example, unengraved materials may be stacked and bent (for example, into one of shape 402, shape 404, and/or shape 406) and subsequently engraved using a 3-, 4-, or 5-axis controlled laser system, such as that depicted in FIGS. 1, 2A, and 2B. Alternatively, structures 408 could be engraved on an unformed material which is subsequently formed into the desired shapes for packing.

Figure 5B:
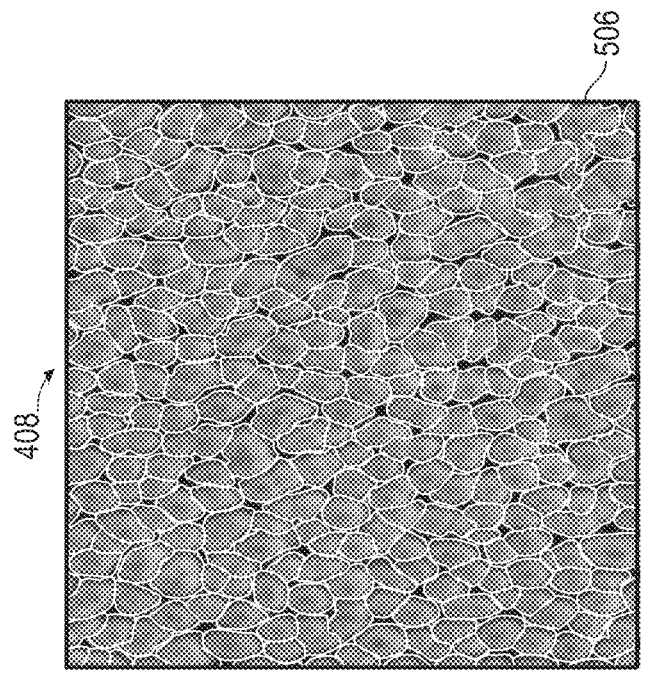
FIG. 5B depicts exemplary pyramidal protrusions formed on a substrate using a high-speed laser.
Figure 5A:
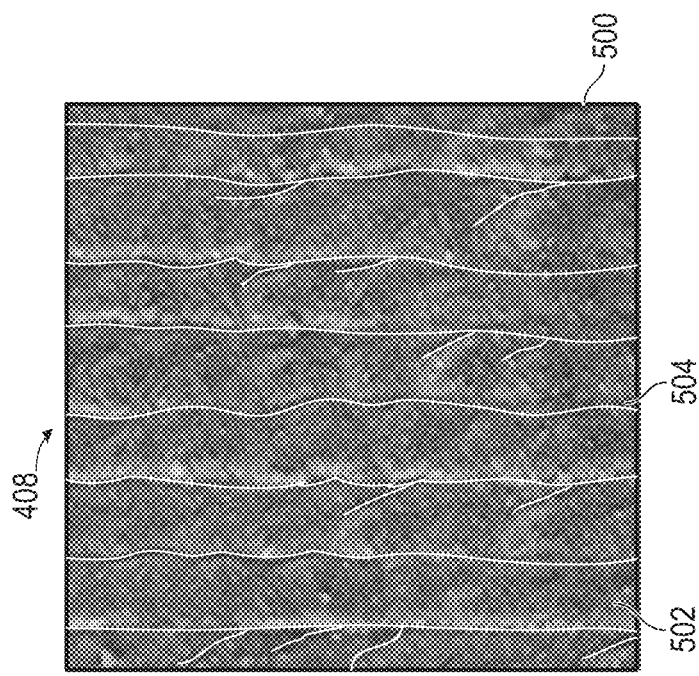
FIG. 5A depicts exemplary parallel channels formed on a substrate using a high-speed laser.

FIG. 5A depicts an example of structures 408 on the surface of exemplary packing materials 400. Here, structures 408 include channels 500, which can be optimized depending on the desired application (for example, on a desired level of hydrophilicity). Channels 500 may comprise varying structures, including random or designed patterns on the surfaces of packing material 306 to increase the liquid-to-gas contact and removal of unwanted materials. Structures 408 may be the result of high-energy laser system 100 providing laser beam 258 onto the surface of packing material 306 as described above. The laser beam 258 may be specifically controlled to create channels 500 by a person manually controlling high-energy laser system 100 and/or by computer 800. Structures 408 on each surface of packing material 306 may include peaks 502 and troughs 504. Each trough 504 corresponds with the peaks 502 juxtaposed to the trough 504 to form channels 500, which may be parallel.

In some embodiments, high-energy laser system 100 surface processing technique may increase the surface area of the packing material 306 by engraving the Structures 408 in specific patterns on the surface, as shown in FIGS. 5A and 5B. For example, dimples or ridges may be provided on the surface, increasing the area in contact with the liquid and/or gas and allowing for more heat transfer away from the packing material 306. As another example, various surface patterns could induce turbulence which in turn may improve the heat transfer coefficient, or channels 500 could be employed to increase the surface area and thereby reduce the emissivity of the surface, improving liquid-vapor contact and removal of unwanted material. Structures 408 may be a micro-size or nano-size. Although specific structures such as dimples, ridges, and channels are used as an example herein, any pattern or irregular shape comprising various widths and depths may be ablated into the surface of packing material 306. Furthermore, the size and shape of structures 408 can be optimized depending on the desired application.

FIG. 5B depicts protrusions 506 (for example, pyramidal shapes or mounds) that can be optimized depending on the desired application of packing material 306. Protrusions 506 comprise microstructures ablated onto the surface of packing material 306. In some embodiments, as described above, structures 408 may improve the hydrophilic or hydrophobic properties of the substrate chosen for the packing material 306. For example, deeper instances of protrusions 506 may provide hydrophilic or hydrophobic properties by allowing the liquid to wick between the protrusions 506 and travel quickly through the packing material 306. Such qualities may be advantageous for the purposes of channeling liquid on the surface of packing material 306 to improve the surface-area-to-volume ratio between liquid and gas phases and provide hydrophilic channeling. For example, a heterogeneous mixture comprising a hydrophilic liquid (e.g., water) and a hydrophobic liquid (e.g., oil) may be separated by exposing the heterogeneous mixture to a hydrophilic microstructure, as described above, which would naturally absorb and wick away the liquid while leaving the oil behind.

In some embodiments, packing material 306 may exhibit surface roughness because of the ablation of structures 408. The micro-scale or nano-scale surface roughness of packing material 306 may trap a layer of air. The layer of air may prevent ice from adhering strongly to the surface, thus preventing obstacles in the channels and improving the overall flow of the hydrophilic liquid and improving efficiency.

Structures 408 ablated on packing material 306 may be various sizes, shapes, and distribution to tailor the surface roughness of the packing material 306. As such, the surface friction of the packing material 306 may be reduced. A decrease in surface friction may reduce drag. For example, high-energy laser system 100 surface processing technique may create tiny grooves in the packing material 306 in the direction of fluid flow to guide the fluid. The small grooves (e.g., channels 500 depicted in FIGS. 5A and 5B) in packing material 306 may create a state where the fluid meeting the surface remains in a laminar state. In turn, the small grooves in the example may reduce turbulence and drag.

Figure 6B:
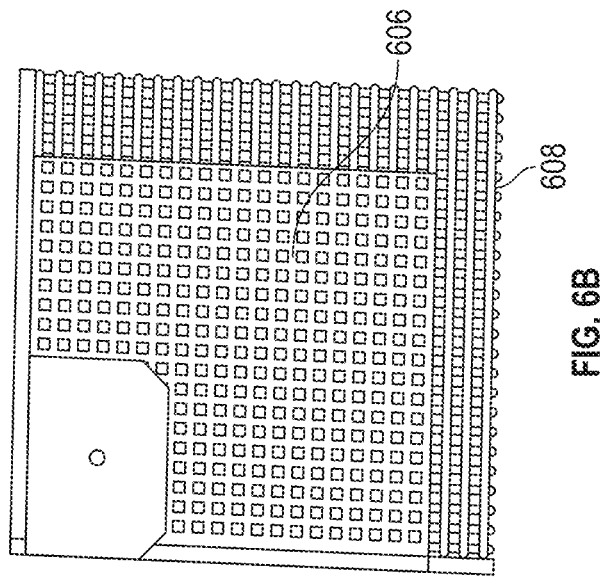
FIG. 6B depicts the exemplary aluminum surface from FIG. 6A after the aluminum surface has undergone wicking of the water.
Figure 6A:
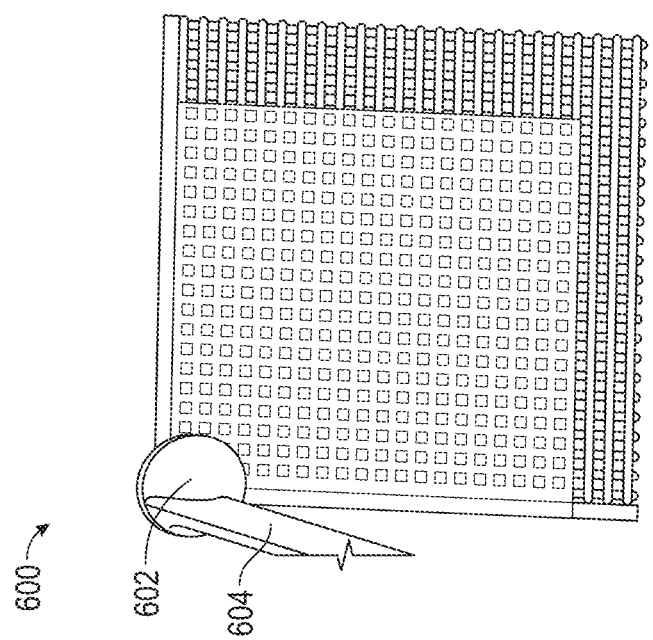
FIG. 6A depicts an exemplary aluminum surface prior to undergoing wicking.

In reference to FIGS. 6A and 6B, an example of an aluminum surface 600 as a sheet of packing material 306 is shown. As an example, utensil 602 may be utilized to drop oil 604 onto the aluminum surface 600. The oil 604 and the surface of packing material 306 cause the water 606 to wick down the surface while oil maintains separation from water 606. In some embodiments, the packing material 306 may include hydrophilic portions and hydrophobic portions. In such embodiments, water 606 may bond with the hydrophilic portions (leading to water absorption) while the hydrophobic portions push water away but retain the oil. The nanoscale surface roughness of hydrophilic portions attracts water 606 and allows water 606 to easily wick across the surface of packing material 306. The hydrophobic portions, by contrast, are wetted by the oil 604 and may either retain oil 604 or channel it away from water 606. As such, the water 606 may be separated from the oil 604. In FIG. 6B, the effects of wicking 608 are shown as the water 606 easily flows through structures 408. For example, most metal surfaces are hydrophilic, so the hydrophilic material that is depicted in the example of FIGS. 6A and 6B may be metal (e.g., aluminum), while the hydrophobic material may be plastic.

In some embodiments, high-energy laser system 100 may be used to create structures 408 comprising a pattern of hydrophobic and hydrophilic regions in a single type of exemplary packing materials 400. The results of the pattern of hydrophobic and hydrophilic regions may cause water to bead up in the hydrophilic areas but allow water to flow in the other regions, which is called a "pinning" effect. Similarly, the high-energy laser system 100 surface processing technique may be used to create a superhydrophobic surface. Water may bead up and roll off the surface rather than spreading out and potentially freezing. For example, in some scenarios, a sheet of micro-structured hydrophobic material may be employed on the slatted interior and/or exterior wall of a cooling tower. By shedding the water that might otherwise condense and accumulate on the wall and freeze, such micro-structured hydrophobic materials can prevent ice accumulations that would impact the operation of the cooling tower. This may further prevent the accumulation of moisture. Furthermore, the pinning effect may prevent the growth of bacteria and prevent the formation of ice as the water is repelled from the surface. Additionally, the high-energy laser system 100 surface processing technique may modify the surface chemistry of the packing material 306 resulting in additional benefits. For example, copper or silver in contact with the surface may create a thin layer with antibacterial properties.

Figure 7:
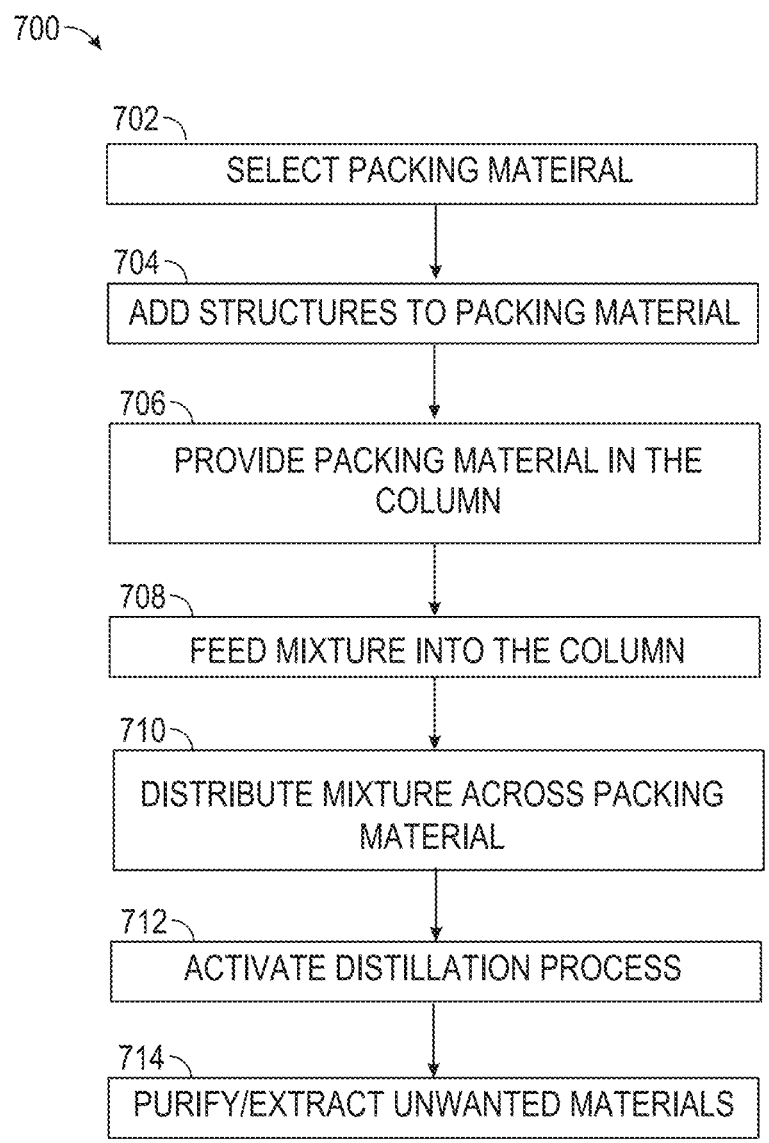
FIG. 7 is a flowchart illustrating an exemplary surface processing method using a high-speed laser to make super wettable tower packing.

Referring now to FIG. 7, a method of improving surface contact between phases by the column packing systems described above is presented and generally referenced by reference numeral 700. At step 702, packing material 306 may be selected based on the objective. Packing material 306 may be any material particularly suited to perform the functions described above. Packing material 306 may comprise aluminum, plastic, ceramic, metal, elastic, porcelain, silica, or any other material that may achieve the characteristics described in embodiments herein.

In some embodiments, the size and shape of packing material 306 may also be selected and manufactured based on the user case of packing material 306. Above, exemplary sizes and shapes of packing material 306 are described and shown in FIG. 4. However, packing material 306 may be any size and shape suitable for its purpose.

At step 704, high-energy laser system 100 may be utilized to modify packing material 306. High-energy laser system 100 may be manually- and/or computer-operated to ablate structures 408 onto the surface of packing material 306. As described above, structures 408 may be any size and shape specific to the intended purpose of packing material 306. Laser beam 258 may be provided to packing material 306 to generate structures 408 comprising troughs and protrusions in various shapes and patterns and/or to modify the surface chemistry of packing material 306. The various instances of structures 408 may increase the hydrophilic and/or the hydrophobic properties of packing material 306 as described above. As such, structures 408 may increase the efficiency of the industrial column packing processes, including vapor-liquid contact, impurity removal, and material component separation.

At step 706, packing material 306 may be provided in tower 300. Tower 300 may be any standard industrial column packing tower as described herein or a reduced-size industrial column packing tower, enabled by the enhanced mixing of packing material 306. In some embodiments, packing material 306 includes micro-sized and/or nano-sized structures on packing material 306 as described above. These structures may be any shape and size and may serve to increase the usable surface area, thereby increasing the surface area per unit volume between the two phases. The increased surface area contact between the two phases, in turn, allows for improved heat and mass transfer between the two phases in column 314. In some embodiments, the size, shape, and depth of structures 408 may be optimized for the most efficient mass transfer, clean water/gas extraction, and/or material component separation, as described above.

At step 708, the mixture (e.g., the liquid phase) is added at liquid inlet 316. The mixture may be any mixture that includes unwanted material and may be the byproduct of industrial manufacturing, chemical manufacturing, or any other waste stream that is desired to be purified. In embodiments described herein, the mixture is described as including unwanted material; however, any use case may be implemented including, but not limited to, pharmaceuticals, component separation, filtering, vacuum distillation, material purification, and the like.

At step 710, the mixture may be poured over tray distributor 304. Tray distributor 304, in some embodiments, distributes the mixture across packing material 306 disposed below tray distributor 304 in column 314. As the mixture flows over packing material 306, the gas phase may be pumped into tower 300 by air pump 308 at air inlet 310. The gas phase and mixture contact within column 314 to provide the distillation process described above.

In some embodiments, the processes described herein may be used to purify one of the phases or to recover a target material, as well as other above-described processes. At step 712, the process may be activated and continuously maintained. In some embodiments, the packing material 306 aids in increasing the surface area between the gas phase and the liquid phase in the distillation process of the tower, as described above. The increase in surface area between the gas phase and the liquid phase may increase the exchange of mass and heat, causing a higher rate of distillation. Packing of the packing material 306 may allow the break-up of liquid as the mixture is distributed across the packing material 306, which results in high surface area contact. Here, target materials in the gas phase or the liquid phase may be removed. The liquid phase and the gas phase of the mixture may continuously interact to remove the unwanted materials or components from the mixture as described in the above processes.

At step 714, the mist (i.e., vapor) may be eliminated at mist emitter 302, and any condensed water (or other liquids) may be distributed back into the column. The unwanted materials may be removed from the gas (e.g., steam) by condensing and purifying the gas. Furthermore, clean water or unwanted material may be removed from tower 300 at outlet 312.

An exemplary scenario to utilize the above-described method may be in removing sulfur compounds from flue gas. The gas may be passed through packed columns with water. The sulfur compounds may be more efficiently absorbed into the water based on the high surface area contact between the sulfur compound and the water created by packing material 306 with structures 408. The processes described above may facilitate the absorption of the sulfur compounds into the water. Therefore, as the flue gas is vented off, the sulfur compounds are trapped and are not vented into the atmosphere with the flue gas.

In another exemplary scenario, micro-sized and nano-sized scale structures created by a high-energy laser system 100 surface processing technique may prevent bacterial adhesion. The textures may physically disrupt the bacteria's ability to attach to the surface, which in turn prevents the bacteria from growing and multiplying.

In yet another exemplary scenario, micro-size and nano-size structures are created by high-energy laser system 100 in a battery or a capacitor packing material. The micro-size and nano-size structures on a battery or capacitor packing material surface may increase the surface area and allow for more ion or electron contact points. In a battery, the micro-size and nano-size structures can improve the ion transfer between the electrode and electrolyte, overall increasing the battery's performance. In a capacitor, the increased area can increase the capacitance. The surface structures created by high-energy laser system 100 surface processing technique may enhance the penetration of the electrolyte into the electrode packing material, improving the performance of batteries because the ions can reach more of the active packing material. Furthermore, the micro-size and nano-size structures may aid in efficient heat dissipation. The high-energy laser system 100 may be used to modify the surface of the electrode packing material to further tailor their properties to alter the conductivity or porosity.

In still another exemplary scenario, the high-energy laser system 100 may apply thermal barrier coatings to the surface of packing material 306. Here, packing material 306 may comprise low thermal conductivity. In turn, the amount of heat that the surface emits is reduced, which may make the object less visible to thermal imaging systems. Absorptive coatings may also be created to absorb radar waves and may make the object less detectable by radar systems. In a related exemplary scenario, high-energy laser system 100 may create structures 408 that scatter incident light in different directions. Such scattering structures may allow the object to be less visible across a range of wavelengths, including reduced visibility in both the visible and infrared parts of the spectrum.

Figure 8:
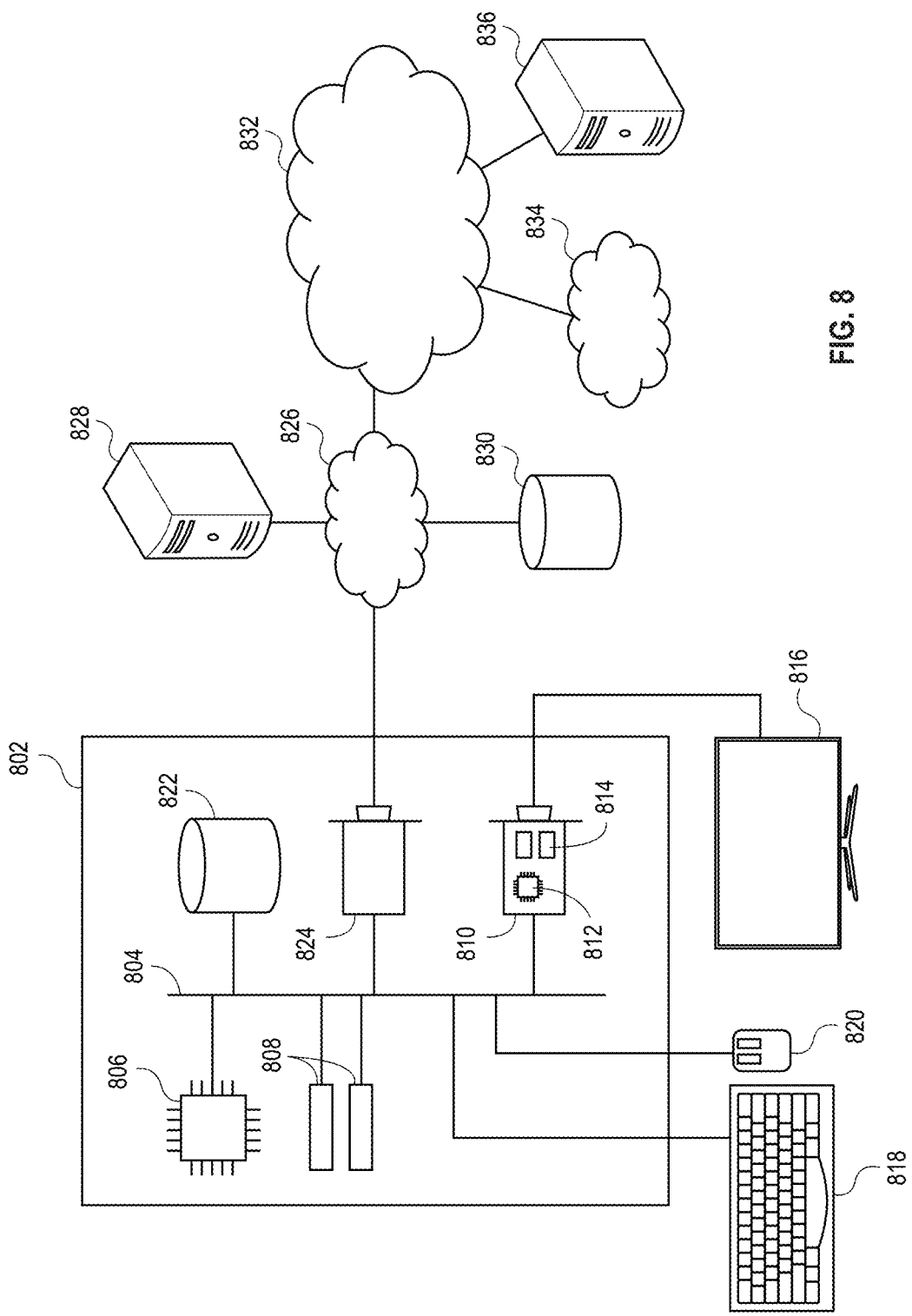
FIG. 8 depicts exemplary computing hardware for some embodiments.

Turning to FIG. 8, an exemplary hardware platform from certain embodiments of the invention is depicted. Computer 802 can be a desktop computer, a laptop computer, a server computer, a mobile device such as a smartphone or tablet, or any other form factor of general or special-purpose computing device. Computer 802 may be used to operate and/or control high-energy laser system 100 as described above. Depicted with computer 802 are several components for illustrative purposes. In some embodiments, certain components may be arranged differently or absent. Additional components may also be present. Included in computer 802 is system bus 804, whereby other components of computer 802 can communicate with each other. In certain embodiments, there may be multiple buses, or components may communicate with each other directly. Connected to system bus 804 is the central processing unit, CPU 806. Also attached to system bus 804 are one or more random-access memory (RAM) modules 808. Also attached to system bus 804 is graphics card 810. In some embodiments, graphics card 810 may not be a physically separate card but rather may be integrated into the motherboard or the CPU 806. In some embodiments, graphics card 810 has a separate graphics-processing unit (GPU) 812, which can be used for graphics processing or for general-purpose computing (GPGPU). Also on graphics card 810 is GPU memory 814. Connected (directly or indirectly) to graphics card 810 is display 816 for user interaction. In some embodiments, no display is present, while in others, it is integrated into computer 802. Similarly, peripherals such as keyboard 818 and mouse 820 are connected to system bus 804. Like display 816, these peripherals may be integrated into computer 802 or absent. Also connected to system bus 804 is local storage 822, which may be any form of computer-readable media and may be internally installed in computer 802 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical but transitory forms of signal transmission such as radio broadcasts, electrical signals through a wire, or light pulses through a fiber-optic cable. Examples of stored information include computer-useable instructions, data structures, program modules, and other data representations.

Finally, the network interface card, NIC 824, is also attached to system bus 804 and allows computer 802 to communicate over a network such as local network 826. NIC 824 can be any form of network interface known in the art, such as Ethernet, ATM, fiber, BLUETOOTH, or Wi-Fi (i.e., the IEEE 802.11 family of standards). NIC 824 connects computer 802 to local network 826, which may also include one or more other computers, such as computer 828, and network storage, such as data store 830. Generally, a data store such as data store 830 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 828, accessible on a local network such as local network 826, or remotely accessible over Internet 832. Local network 826 is in turn connected to Internet 832, which connects many networks such as local network 826, remote network 834 or directly attached computers such as computer 836. In some embodiments, computer 802 can itself be directly connected to Internet 832.

In some aspects, the techniques described herein relate to a method of improving surface area contact between a liquid and a vapor in an industrial packing column, the method including: ablating packing material with a high-energy laser to create structures on a surface of the packing material to create a high-surface-area packing material; providing the high-surface-area packing material in a column packing tower; providing a mixture including an unwanted material in a liquid phase into the column packing tower above the high-surface-area packing material; providing a gas from below the high-surface-area packing material; removing the unwanted material from the liquid phase by absorbing the unwanted material into the gas at a contact surface between the liquid phase and the gas on the high-surface-area packing material; extracting the unwanted material from the gas; and venting the gas from the column packing tower.

In some aspects, the techniques described herein relate to a method, wherein the packing material is selected from a set consisting of plastic, ceramic, and metal.

In some aspects, the techniques described herein relate to a method, wherein the packing material is at least one material sheet, wherein the structures include a pattern ablated into the at least one material sheet.

In some aspects, the techniques described herein relate to a method, further including bending the at least one material sheet to increase a mixing rate of the liquid phase and the gas in the column packing tower.

In some aspects, the techniques described herein relate to a method, wherein the structures include a depth in a range of 1-100 microns.

In some aspects, the techniques described herein relate to a method, wherein the structures of the high-surface-area packing material further include a plurality of distinct patterns that increase an absorption rate of the unwanted material.

In some aspects, the techniques described herein relate to a method, wherein the high-energy laser is a femtosecond laser.

In some aspects, the techniques described herein relate to a method, wherein the mixture is heterogeneous, wherein the structures are hydrophilic, and wherein the unwanted material includes oil.

In some aspects, the techniques described herein relate to a method, wherein the high-surface-area packing material is provided in the column packing tower randomly, wherein the high-surface-area packing material includes a plurality of distinct shapes and sizes.

In some aspects, the techniques described herein relate to a method, wherein the high-surface-area packing material is provided in the column packing tower in a structured order based on a size and a shape of the high-surface-area packing material.

In some aspects, the techniques described herein relate to a method of improving surface area contact between a liquid and a vapor in an industrial packing column, the method including: ablating packing material by a high-energy laser to create structures on a surface of the packing material to create a high-surface-area packing material, the structures selected from a set consisting of nano-sized channels and micro-sized channels; randomly providing the high-surface-area packing material in a column packing tower; providing a mixture including an unwanted material in a liquid phase into the column packing tower above the high-surface-area packing material; providing a gas from below the high-surface-area packing material; removing the unwanted material from the liquid phase by absorbing the unwanted material into the gas at a contact area between the liquid phase and the gas at the structures on the surface of the high-surface-area packing material; extracting the unwanted material from the gas; and venting the gas from the column packing tower.

In some aspects, the techniques described herein relate to a method, wherein the structures of the high-surface-area packing material increase a rate of absorption of the unwanted material via an increased surface area of the high-surface-area packing material as compared to the packing material.

In some aspects, the techniques described herein relate to a method, wherein the high-energy laser is a femtosecond laser.

In some aspects, the techniques described herein relate to a method, wherein a material of the packing material is a hydrophilic metal.

In some aspects, the techniques described herein relate to a system for improving surface area contact between a liquid and a vapor in an industrial packing column, the system including: high-surface-area packing material including structures ablated by a high-energy laser on a surface of a packing material, wherein the structures are nano-sized or micro-sized; a column packing tower housing the high-surface-area packing material in a random structure; a mixture including an unwanted material in a liquid phase is provided into the column packing tower above the high-surface-area packing material; a gas provided into the column packing tower from below the high-surface-area packing material; wherein the unwanted material is removed from the liquid phase by absorbing the unwanted material into the gas at a contact area at the structures on the surface of the high-surface-area packing material; extracting the unwanted material from the gas; and a vent venting the gas from the column packing tower.

In some aspects, the techniques described herein relate to a system, wherein the packing material is selected from a set consisting of plastic, ceramic, and metal.

In some aspects, the techniques described herein relate to a system, wherein the packing material is at least one material sheet, wherein the structures include patterns ablated on the at least one material sheet.

In some aspects, the techniques described herein relate to a system, wherein the mixture is heterogeneous, wherein the structures are hydrophilic, and wherein the unwanted material includes oil.

In some aspects, the techniques described herein relate to a system, wherein the high-surface-area packing material includes a plurality of distinct shapes and sizes.

In some aspects, the techniques described herein relate to a system, wherein the high-surface-area packing material is provided in the column packing tower in a structured order based on a size and a shape of the high-surface-area packing material.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of improving surface area contact between a liquid and a vapor in an industrial packing column, the method comprising:
    ablating packing material with a laser to create surface structures on a surface of the packing material to create an ablated packing material,
    wherein the surface structures comprise irregular channels having varying widths and depths, increasing a surface area of the packing material;
    providing the ablated packing material in a column packing tower;
    providing a fluid mixture comprising an unwanted material in a liquid phase into the column packing tower above the ablated packing material;
    providing a gas from below the ablated packing material;
    removing the unwanted material from the liquid phase by absorbing the unwanted material into the gas at a contact surface between the liquid phase and the gas on the ablated packing material; and
    venting the gas from the column packing tower.

2. The method of claim 1, wherein the packing material is selected from a set consisting of plastic, ceramic, and metal.

3. The method of claim 1,
    wherein the packing material comprises a plurality of material sheets.

4. The method of claim 3, further comprising bending and stacking the plurality of material sheets to increase a mixing rate of the liquid phase and the gas in the column packing tower.

5. The method of claim 3, wherein the irregular channels comprise a depth in a range of 1-100 microns and are configured to wick the fluid mixture.

6. The method of claim 1, wherein the surface structures of the ablated packing material further comprise dimples and ridges that increase an absorption rate of the unwanted material.

7. The method of claim 1, wherein the laser is a femtosecond laser.

8. The method of claim 1,
    wherein the fluid mixture is heterogeneous,
    wherein the surface structures are hydrophilic, and
    wherein the unwanted material comprises oil.

9. The method of claim 1,
    wherein the ablated packing material is provided in the column packing tower randomly,
    wherein the ablated packing material comprises a plurality of distinct shapes and sizes.

10. The method of claim 1, wherein the ablated packing material is provided in the column packing tower in a structured order based on a size and a shape of the ablated packing material.

11. A method of improving surface area contact between a liquid and a vapor in an industrial packing column, the method comprising:
- ablating packing material by a laser to create surface structures on a surface of the packing material to create an ablated packing material, the surface structures selected from a set consisting of nano-sized channels and micro-sized channels,
- wherein the surface structures comprise irregular channels having varying widths and depths, increasing a surface area of the packing material;
- randomly providing the ablated packing material in a column packing tower;
- providing a fluid mixture comprising an unwanted material in a liquid phase into the column packing tower above the ablated packing material;
- providing a gas from below the high-surface area ablated packing material;
- removing the unwanted material from the liquid phase by absorbing the unwanted material into the gas at a contact area between the liquid phase and the gas at the surface structures on the surface of the ablated packing material;
- extracting the unwanted material from the gas; and
- venting the gas from the column packing tower.

12. The method of claim 11, wherein the surface structures of the ablated packing material further comprise dimples and ridges to increase a rate of absorption of the unwanted material via an increased surface area of the ablated packing material as compared to the packing material.

13. The method of claim 11, wherein the laser is a femtosecond laser.

14. The method of claim 11, wherein the packing material is a hydrophilic metal.

* * * * *